(12) United States Patent
Kobayashi et al.

(10) Patent No.: US 9,970,827 B2
(45) Date of Patent: May 15, 2018

(54) FUEL TEMPERATURE ESTIMATION DEVICE

(71) Applicant: VOLVO TRUCK CORPORATION, Gothenburg (SE)

(72) Inventors: Shigemi Kobayashi, Ageo (JP); Kazuhiro Kujirai, Ageo (JP); Masahiro Misawa, Ageo (JP); Takafumi Amano, Ageo (JP); Yousuke Aoyama, Ageo (JP)

(73) Assignee: VOLVO TRUCK CORPORATION, Gothenburg (SE)

(*) Notice: Subject to any disclaimer, the term of this patent is extended or adjusted under 35 U.S.C. 154(b) by 336 days.

(21) Appl. No.: 14/735,054

(22) Filed: Jun. 9, 2015

(65) Prior Publication Data
US 2015/0276505 A1 Oct. 1, 2015

Related U.S. Application Data

(63) Continuation of application No. PCT/JP2013/081252, filed on Nov. 20, 2013.

(30) Foreign Application Priority Data

Dec. 10, 2012 (JP) .................................. 2012-269070

(51) Int. Cl.
*G01K 11/00* (2006.01)
*F02D 41/38* (2006.01)
(Continued)

(52) U.S. Cl.
CPC .......... *G01K 11/00* (2013.01); *F02D 41/3809* (2013.01); *G01K 7/42* (2013.01);
(Continued)

(58) Field of Classification Search
CPC ...... G01K 13/00; G01K 13/02; F02D 41/222; F01N 11/007; F01N 13/009;
(Continued)

(56) References Cited

U.S. PATENT DOCUMENTS 4,590,907 A * 5/1986 Tsukamoto ......... F02D 41/0085
123/357
4,612,804 A * 9/1986 Colonnello ............... G01F 3/10
73/114.52

(Continued)

FOREIGN PATENT DOCUMENTS

CN 101429896 A 5/2009
CN 101614167 A 12/2009
(Continued)

OTHER PUBLICATIONS

Chinese Office Action from Chinese Patent Application No. 201380064264.7, dated Feb. 28, 2017.
(Continued)

*Primary Examiner* — Gail Kaplan Verbitsky
(74) *Attorney, Agent, or Firm* — McDermott Will & Emery LLP

(57) ABSTRACT

A fuel temperature estimation device that can improve the estimation accuracy of a fuel temperature in each part of a fuel channel, is provided. In the invention, the fuel temperature estimation device estimates the fuel temperature of each part of the fuel channel in a vehicle (for example, an injection nozzle, a pressure accumulator, a high-pressure pump), and includes a flow rate measuring device that measures a fuel flow rate of a fuel return system of the fuel channel and a controller. The controller includes a fuel temperature correction unit that corrects an estimated fuel temperature in a fuel injection system based on the fuel flow rate of the fuel return system, and has a function of esti- (Continued)

mating the fuel temperature using the fuel flow rate of the fuel return system as a parameter.

4 Claims, 10 Drawing Sheets

(51) Int. Cl.
- G01K 15/00 (2006.01)
- G01K 7/42 (2006.01)
- F02M 37/00 (2006.01)
- G01K 13/02 (2006.01)

(52) U.S. Cl.
CPC ........... *G01K 7/427* (2013.01); *G01K 15/005* (2013.01); *F02D 2200/0602* (2013.01); *F02D 2200/0608* (2013.01); *F02M 37/0052* (2013.01); *G01K 2013/026* (2013.01); *G01K 2205/00* (2013.01)

(58) Field of Classification Search
CPC ........... F01N 2560/025; F01N 2560/06; F01N 2900/1404; F01N 2900/1614; F01N 3/021; F01N 3/0814; F01N 3/0821; F01N 3/0842; F01N 3/0885; F01N 9/00; F01N 9/002; F01N 9/005
USPC ...... 374/45, 141, 1, 143, 144; 701/103, 104; 73/114.01, 114.42, 114.38, 30.03; 702/99
See application file for complete search history.

(56) References Cited

U.S. PATENT DOCUMENTS

| | | | | |
|---|---|---|---|---|
| 5,082,426 A * | 1/1992 | Sasaki | ................. | B60K 15/077 180/314 |
| 5,107,431 A * | 4/1992 | Ohta | ..................... | F02D 41/105 123/480 |
| 5,408,866 A * | 4/1995 | Kawamura | ........ | F02M 25/0809 123/516 |
| 5,448,980 A | 9/1995 | Kawamura et al. | | |
| 5,483,945 A * | 1/1996 | Kobayashi | .......... | F02D 41/2445 123/374 |
| 5,902,346 A * | 5/1999 | Cullen | ................... | F02D 41/28 701/102 |
| 5,931,136 A * | 8/1999 | Isobe | ........................ | F02D 9/10 123/399 |
| 5,950,419 A * | 9/1999 | Nishimura | .......... | F02D 41/0255 60/274 |
| 6,024,072 A * | 2/2000 | Hamada | .............. | F02D 41/3082 123/456 |
| 6,047,682 A * | 4/2000 | Fujino | ................. | F02D 41/3809 123/357 |
| 6,434,476 B1 * | 8/2002 | Zagone | ................. | F02D 41/222 123/568.16 |
| 6,647,968 B1 * | 11/2003 | Hankins | ................ | F02D 33/006 123/459 |
| 6,877,488 B2 * | 4/2005 | Washeleski | ...... | B60K 15/03504 123/41.31 |
| 7,448,260 B2 * | 11/2008 | Pividori | .................... | G01F 3/10 73/114.52 |
| 8,788,165 B2 * | 7/2014 | Yuyama | .................. | F16H 59/72 374/144 |
| 9,617,960 B2 * | 4/2017 | Saito | ...................... | F02M 51/00 |
| 9,702,779 B2 * | 7/2017 | Kumano | ............... | F02D 35/026 |
| 2010/0263623 A1 * | 10/2010 | Sakurai | ................... | F01N 3/027 123/25 J |
| 2011/0209534 A1 * | 9/2011 | Capristo | ............... | G01M 15/05 73/114.52 |
| 2012/0020384 A1 * | 1/2012 | Mikami | .............. | F02D 41/3836 374/144 |
| 2015/0122217 A1 * | 5/2015 | Bullmer | ................. | F02M 53/02 123/295 |
| 2015/0128683 A1 * | 5/2015 | Kumano | ............... | F02D 35/026 73/35.08 |

FOREIGN PATENT DOCUMENTS

| | | |
|---|---|---|
| DE | 102009002200 | 10/2010 |
| EP | 2058498 A1 | 5/2009 |
| JP | 6-235354 A | 8/1994 |
| JP | 6-235355 A | 8/1994 |
| JP | 2003176761 A * | 6/2003 ........... F02D 41/064 |
| JP | 2005-048659 A | 2/2005 |
| JP | 2005-076596 A | 3/2005 |
| JP | 2011-179512 A | 9/2011 |

OTHER PUBLICATIONS

International Preliminary Report on Patentability dated Jun. 25, 2015, which issued in PCT/JP2013/081252; and English language translation thereof.

Extended European Search Report dated Jun. 28, 2016, which issued in European Application No. 13862583.5.

European Office Action from European Patent Application No. 13862583.5, dated Jun. 20, 2017.

* cited by examiner

FUEL TEMPERATURE ESTIMATION DEVICE

CROSS-REFERENCE TO RELATED APPLICATION

This application is a continuation application of PCT/JP2013/081252, filed on Nov. 20, 2013, which is incorporated by reference in its entirety for all purposes.

BACKGROUND OF THE INVENTION

1. Field of the Invention

The present invention relates to a technology of estimating a fuel temperature of each part (for example, an injection nozzle, a pressure accumulator, a high-pressure pump) of a fuel channel in a vehicle such as an automobile.

2. Description of Related Art

A fuel injected from a fuel injection device into a cylinder becomes different in temperature immediately before the injection according to an engine and a circumstance state (temperature condition) thereof until the fuel is injected from the fuel injection device. Then, a density of the fuel becomes different due to a difference in the fuel temperature immediately before the injection.

Therefore, in a case in which the fuel is supplied to the engine by the fuel injection device, there is a need to correct an injection pressure or a combustion pressure in consideration of a change of the fuel density caused by the difference in the fuel temperature or an influence of an injection pressure, and the fuel temperature is necessarily monitored with accuracy in order to achieve a desirable combustion state.

The fuel temperature has been measured using a thermometer (temperature sensor) in the related art, but in a case in which the temperature sensor malfunctions for some reason, the desirable combustion state may be not secured. In addition, if the fuel temperature can be accurately monitored without the use of the temperature sensor, the number of components can be reduced, and the cost can be reduced.

Therefore, there is a demand for calculating the fuel temperature in an automobile provided with a common rail fuel injection device without the use of the thermometer (temperature sensor) in the related art.

In order to meet such a demand, there is already disclosed a technology of calculating the fuel temperature in the automobile provided with the common rail fuel injection device without the use of the thermometer (for example, see Patent Document 1). According to the related art (Patent Document 1), the fuel temperature is estimated based on a water temperature of the engine and a characteristic of the fuel temperature, and the estimation value of the fuel temperature is corrected using the fuel remainder in a fuel tank.

In this regard, there is a demand for measuring the fuel temperature with a higher accuracy compared to the related art disclosed in Japanese Patent Application Laid-open Publication No. 2005-76596. However, there is proposed no technology that can meet such a demand at the present time.

SUMMARY OF THE INVENTION

The invention has been made in view of the above demand, and an object thereof is to provide a fuel temperature estimation device that can improve accuracy of estimating a fuel temperature in each part of a fuel channel.

The inventors have studied to solve the problem described above, and as a result found out that the fuel temperature in a fuel channel is affected by the flow rate of a warm fuel returning from the engine to the fuel tank.

Then, the inventors have found out that an accurate estimation of the fuel temperature in each part of the fuel channel can be improved when the flow rate of the warm fuel returning from the engine to the fuel tank is used as a parameter.

According to a first aspect of the present invention, a fuel temperature estimation device of the invention is produced based on such knowledge, and estimates the fuel temperature of each part (for example, the injection nozzle, the pressure accumulator, and the high-pressure pump) of the fuel channels (Lf1 to Lf5, Lf11 to Lf17) of a vehicle (for example, an automobile, etc.). The fuel temperature estimation device includes a flow rate measuring device (SR6) that measures a fuel flow rate of a fuel return system (Lf17) of a fuel channel and a controller (50). The controller (50) includes a fuel temperature correction unit (53) that corrects an estimated fuel temperature in a fuel injection system (3) based on the fuel flow rate of the fuel return system (Lf17), and has a function of estimating the fuel temperature using the fuel flow rate of the fuel return system (Lf17) as a parameter.

According to the embodiment of the first aspect of the present invention having the above configurations, since the fuel temperature in the fuel channel is affected by the flow rate of the warm fuel returning from the engine to the fuel tank (4) as described above, it is possible to improve the accuracy of estimation of the fuel temperature in each part of the fuel channel by using the flow rate of the warm fuel returning from the engine to the fuel tank (4) as a parameter for the control of the fuel temperature estimation.

According to a second aspect of the present invention, a return fuel temperature determination unit (return fuel temperature determination block 56) is provided to determine the fuel temperature of the fuel return system (Lf17) of the fuel channel. The fuel temperature correction unit (53) has a function of correcting the estimated fuel temperature in the fuel injection system (3) based on the fuel flow rate and the fuel temperature of the fuel return system (Lf17). It is desirable that the controller (50A) have a function of estimating the fuel temperature using the fuel flow rate and the fuel temperature of the fuel return system as parameters.

Herein, according to the studying of the inventors, it has been found out that the fuel temperature in the fuel channel is affected even by the temperature (the fuel temperature of the fuel return system Lf17 of the fuel channel) of the fuel returning from the engine to the fuel tank (4).

Therefore, according to the embodiment of the second aspect of the present invention, it is possible to improve the accuracy of the fuel temperature estimation by using the fuel flow rate and the fuel temperature of the fuel return system as parameters.

According to a third aspect of the present invention, a temperature measurement device (SR10) is provided to measure a temperature (including a temperature in an engine controller 7 and a temperature of the surface of the engine controller 7) of the engine controller (7) disposed in the vicinity of the fuel channel (Lf1).

The fuel temperature correction unit (53) has a function of correcting the estimated fuel temperature in the fuel injection system based on the fuel flow rate of the fuel return system (Lf17) and the temperature of the engine controller (7).

It is desirable that the controller (50B) have a function of estimating the fuel temperature using the fuel flow rate of the fuel return system and the temperature of the engine controller (7) as parameters.

According to a fourth aspect of the present invention, a temperature measurement device (SR11) is provided to measure a temperature (for example, a temperature in an engine compartment, an intake-air temperature in an intake manifold, etc.) at a place related to the fuel temperature.

The fuel temperature correction unit (53) has a function of correcting the estimated fuel temperature in the fuel injection system (Lf17) based on the fuel flow rate of the fuel return system (Lf17) and the temperature at the place related to the fuel temperature.

It is desirable that the controller (50B) have a function of estimating the fuel temperature using the fuel flow rate of the fuel return system (Lf17) and the temperature at the place related to the fuel temperature as parameters.

According to a fifth aspect of the present invention, there are provided the return fuel temperature determination unit (return fuel temperature determination block 56) that determines the fuel temperature of the fuel return system (Lf17) of the fuel channel and the temperature measurement device (SR10 or SR11) that measures the temperature of the engine controller (7) disposed in the vicinity of the fuel channel or the temperature (for example, the temperature in the engine compartment, the intake-air temperature in the intake manifold, etc.) at the place related to the fuel temperature.

The fuel temperature correction unit (53) has a function of correcting the estimated fuel temperature in the fuel injection system (3) based on the fuel flow rate and the fuel temperature of the fuel return system (Lf17), and the temperature (including a temperature in the engine controller 7 and a temperature of the surface of the engine controller 7) of the engine controller (7) or the temperature at the place related to the fuel temperature.

It is desirable that the controller (50C) have a function of estimating the fuel temperature using the fuel flow rate and the fuel temperature of the fuel return system (Lf17), and the temperature of the engine controller (7) or the temperature at the place related to the fuel temperature as parameters.

Furthermore, according to the studying of the inventors, it has been found out that the fuel temperature in the fuel channel is affected by the temperature (including the temperature in the engine controller 7 and the temperature of the surface of the engine controller 7) of the engine controller (7) disposed in the vicinity of the fuel channel, or the temperature (for example, the temperature in the engine compartment, the intake-air temperature in the intake manifold, etc.) at the place related to the fuel temperature.

Therefore, according to the embodiments of the third, fourth and fifth aspects of the present invention, it is possible to improve the accuracy of estimation of the fuel temperature in each part of the fuel channel by further using the temperature of the engine controller (7) or the temperature at the place related to the fuel temperature as parameters.

In the embodiments of the invention, the vehicle is an automobile, and may be provided with a common rail fuel injection device.

DESCRIPTION OF PREFERRED EMBODIMENTS

A detailed description of the present invention is provided hereunder, with reference to the accompanying drawings.

Figure 1:
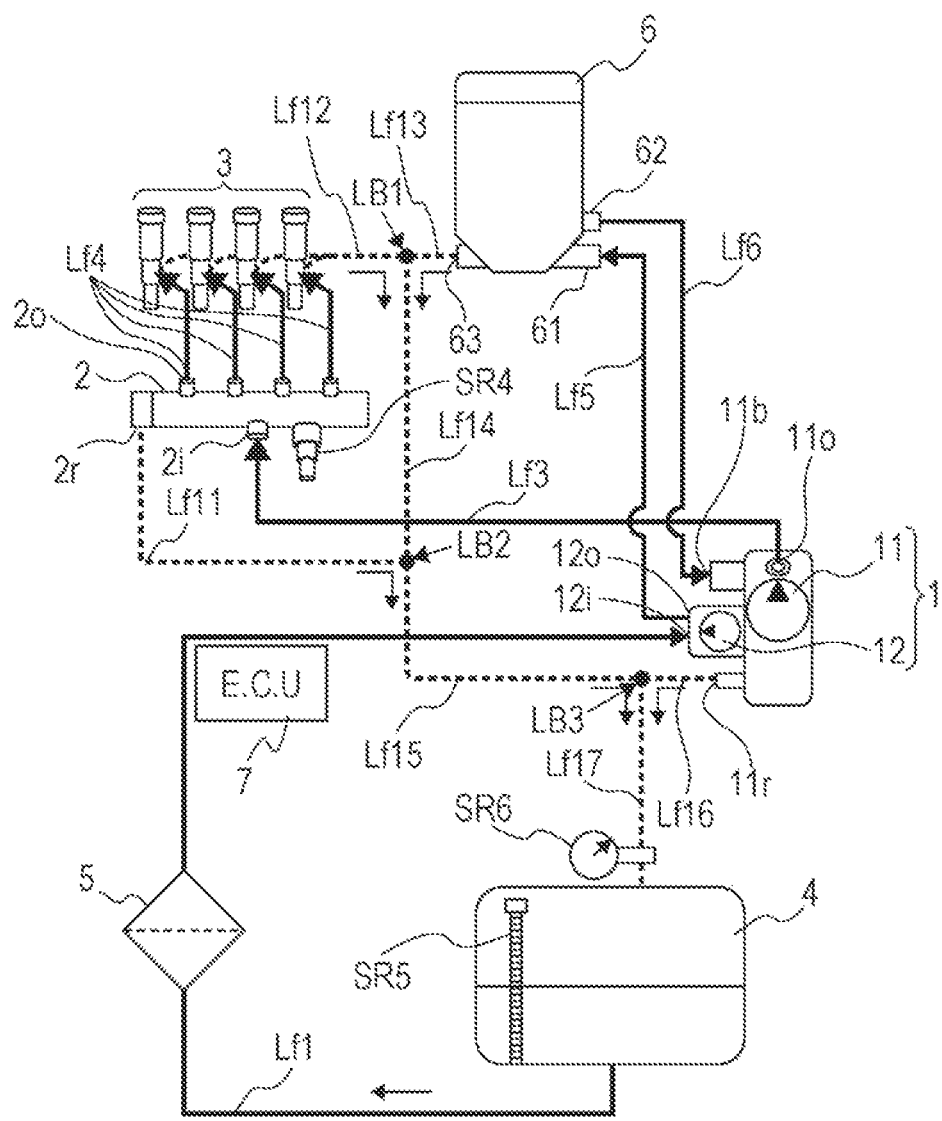
FIG. 1 is a block diagram of a common rail fuel injection device of an automobile to which the invention is implemented.

FIG. 1 illustrates a common rail fuel injection device and a fuel feed system of an automobile (a truck, a car, etc.) to which the invention is implemented.

In FIG. 1, the common rail fuel injection device and the fuel feed system include a fuel pump 1, a common rail 2, an injectors 3, a fuel tank 4, a primary filter (an auxiliary filter) 5, a main filter 6, a fuel feed system (Lf1 to Lf5), and a fuel return system (Lf11 to Lf17).

An engine controller 7 is disposed in the vicinity of a fuel feed line Lf1.

In the outer peripheral of the common rail 2, a common rail pressure sensor SR4 that measures a fuel pressure in the common rail 2 is attached. In the fuel tank 4, an in-tank fuel remainder sensor SR5 that measures a remainder of the fuel in the tank is attached. In a fuel return line Lf17, a return fuel flow rate meter SR6 that measures a flow rate of a warm fuel returning to the tank is interposed.

The fuel pump 1 includes a high-pressure generating unit 11 and a low-pressure generating unit 12.

The fuel tank 4 is connected to an intake port 12*i* of the low-pressure generating unit 12 in the fuel pump 1 through the fuel feed line Lf1, and the primary filter 5 is interposed in the fuel feed line Lf1.

A discharge port 110 of the high-pressure generating unit 11 in the fuel pump 1 is connected to an intake port 2*i* of the common rail 2 through a fuel feed line Lf3.

A plurality ("4" in the illustrated example) of discharge ports 2*o* of the common rail 2 each are connected to a plurality ("4" in the illustrated example) of injectors 3 through a plurality ("4" in the illustrated example) of fuel feed lines Lf4.

A discharge port 12*o* of the low-pressure generating unit 12 in the fuel pump 1 is connected to an intake port 61 of the main filter 6 through a line Lf5. Then, an exhaust port 62 of the main filter 6 is connected to a clean fuel intake port 11*b* in the fuel pump 1 through a line Lf6.

The fuel not fed to a cylinder (not illustrated) of the engine returns to the fuel tank 4 from the fuel feeding apparatuses (the fuel pump 1, the common rail 2, the injectors 3, the fuel tank 4, and the main filter 6).

A fuel return port 2*r* of the common rail 2 is connected to a fuel return line Lf11, and the fuel return line Lf11 communicates with a junction LB2.

The fuel return port (not specified in the drawing) is provided in each of the plurality of injectors 3, the fuel return port (not illustrated) of each of the injectors 3 communicates with a junction LB1 through a fuel return line Lf12.

A fuel return port 63 of the main filter 6 communicates with the junction LB1 through a line Lf13. Then, the junction LB1 communicates with the junction LB2 through a line Lf14. Furthermore, the junction LB2 is connected to a junction LB3 through a line Lf15.

A fuel return port 11r in the fuel pump 1 communicates with the junction LB3 through a line Lf16. Then, the junction LB3 communicates with the fuel tank 4 through a line Lf17.

In a case in which an engine (not illustrated) is operated, the intake port 12i of the low-pressure generating unit 12 of the fuel pump 1 draws the fuel from the fuel tank 4 through the fuel feed line Lf1. At this time, foreign matter having a large particle diameter is removed by the primary filter 5.

The fuel drawn into the low-pressure unit 12 of the fuel pump 1 is increased in pressure, and a part of the fuel is sent to the high-pressure generating unit 11 of the fuel pump 1. The remaining fuel is pumped from the discharge port 12o of the low-pressure generating unit 12 to the main filter 6 through the line Lf5.

The fuel sent to the high-pressure generating unit 11 of the fuel pump 1 is increased in pressure, sent to the intake port 2i of the common rail 2 through the fuel feed line Lf3, and sent to four injectors 3 from the discharge port 2o of the common rail 2 through the line Lf4.

Then, the fuel is injected into four cylinders of the engine (not illustrated) from four injectors 3.

The fuel pumped to the main filter 6 is made clean in the main filter 6, and returns to the clean fuel intake port 11b of the fuel pump 1 through the line Lf6.

The fuel injected from the injectors 3 into the cylinder of the engine (not illustrated) is different in temperature depending on the engine and a circumstance state (temperature condition) thereof. Then, when the temperature of the fuel to be injected is changed, a density of the fuel to be injected becomes changed.

In order to raise a good combustion, there is a need to control a fuel injection pressure to be an optimal injection pressure according to a fuel density at that time. In other words, in order to achieve an optimal combustion in the cylinder of the engine (not illustrated), there is a need to accurately monitor the temperature of the fuel injected into the cylinder from the injectors 3.

Herein, it is difficult to directly measure the temperature of the fuel injected from the injectors 3 into the cylinder of the engine (not illustrated).

In the exemplary embodiment, the temperature of the fuel is measured in portions affecting the temperature of the fuel in the fuel feed system using various types of temperature measuring units, and correction is additionally performed on these measurement values, so that the temperature of the fuel injected from the injectors 3 can be accurately estimated.

Next, a first embodiment of the invention will be described with reference to FIGS. 2 and 3.

Figure 2:
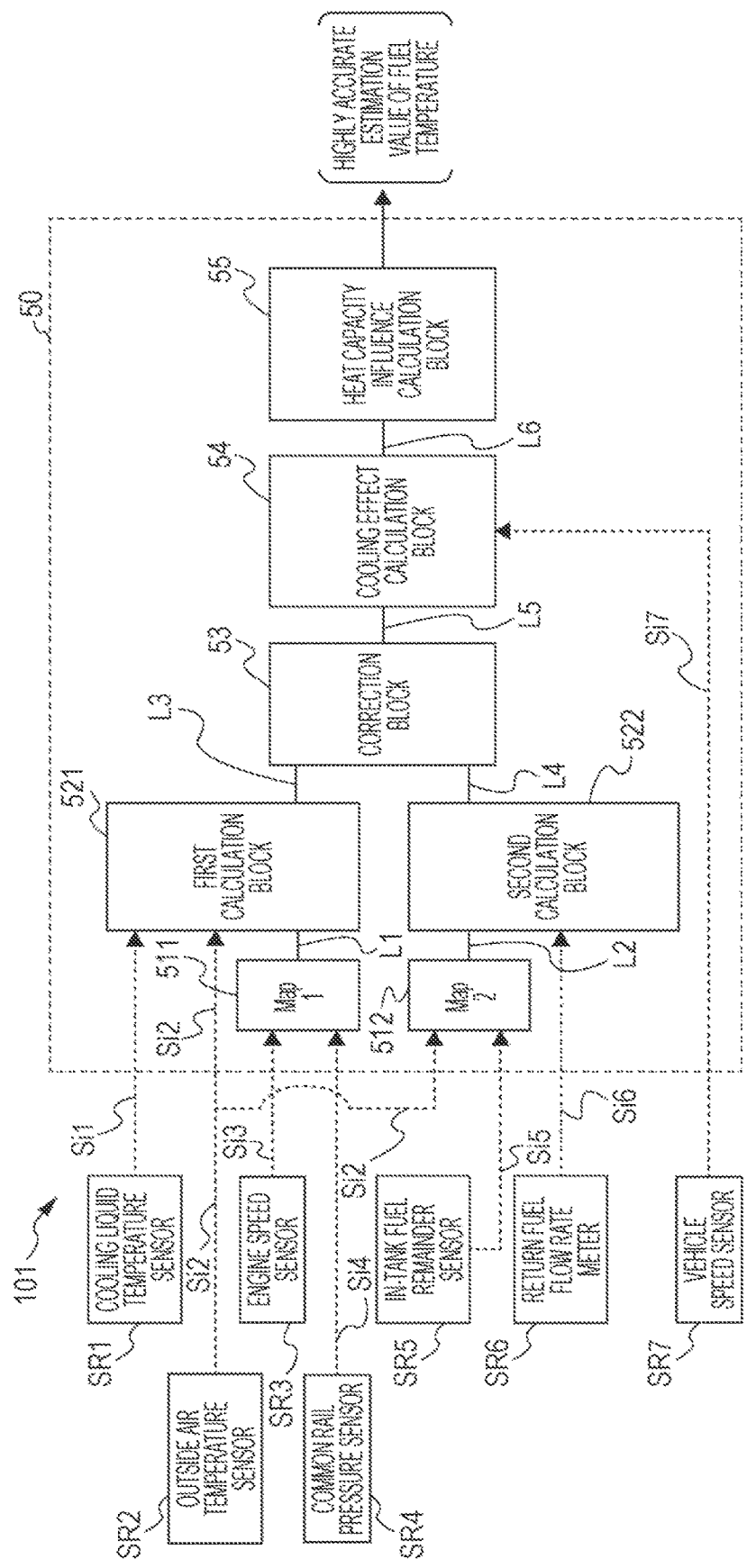
FIG. 2 is a block diagram illustrating a first embodiment of the invention.

In FIG. 2, a fuel temperature estimation device 101 according to the first embodiment includes a controller 50, a cooling liquid temperature sensor SR1, an outside air temperature sensor SR2, an engine speed sensor SR3, the common rail pressure sensor SR4, the in-tank fuel remainder sensor SR5, the return fuel flow rate meter SR6, and a vehicle speed sensor SR7. While not illustrated in the drawing, instead of the return fuel flow rate meter SR6, a fuel amount obtained by subtracting a fuel injection amount of the injector from a drawn fuel amount may be used based on a drawn flow rate control value of the fuel pump.

The controller 50 includes a first map 511, a second map 512, a first calculation block 521, a second calculation block 522, a correction block 53, a cooling effect calculation block 54, and a heat capacity influence calculation block 55.

The cooling liquid temperature sensor SR1 is connected to the first calculation block 521 through an input signal line Si1.

The outside air temperature sensor SR2 is connected to the first calculation block 521 and the second map 512 through an input signal line Si2. The engine speed sensor SR3 is connected to the first map 511 through an input signal line Si3. The common rail pressure sensor SR4 is connected to the first map 511 through an input signal line Si4. The in-tank fuel remainder sensor SR5 is connected to the second map 512 through an input signal line Si5. The return fuel flow rate meter SR6 is connected to the second calculation block 522 through an input signal line Si6. The vehicle speed sensor SR7 is connected to the cooling effect calculation block 54 through an input signal line Si7.

The first map 511 is connected to the first calculation block 521 through a line L1, and the second map 512 is connected to the second calculation block 522 through a line L2. The first calculation block 521 is connected to the correction block 53 through a line L3, and the second calculation block 522 is connected to the correction block 53 through a line L4.

The correction block 53 is connected to the cooling effect calculation block 54 through a line L5, and the cooling effect calculation block 54 is connected to the heat capacity influence calculation block 55 through a line L6.

Next, control of a fuel temperature estimation according to the first embodiment will be described with reference to FIGS. 2 and 3.

Figure 3:
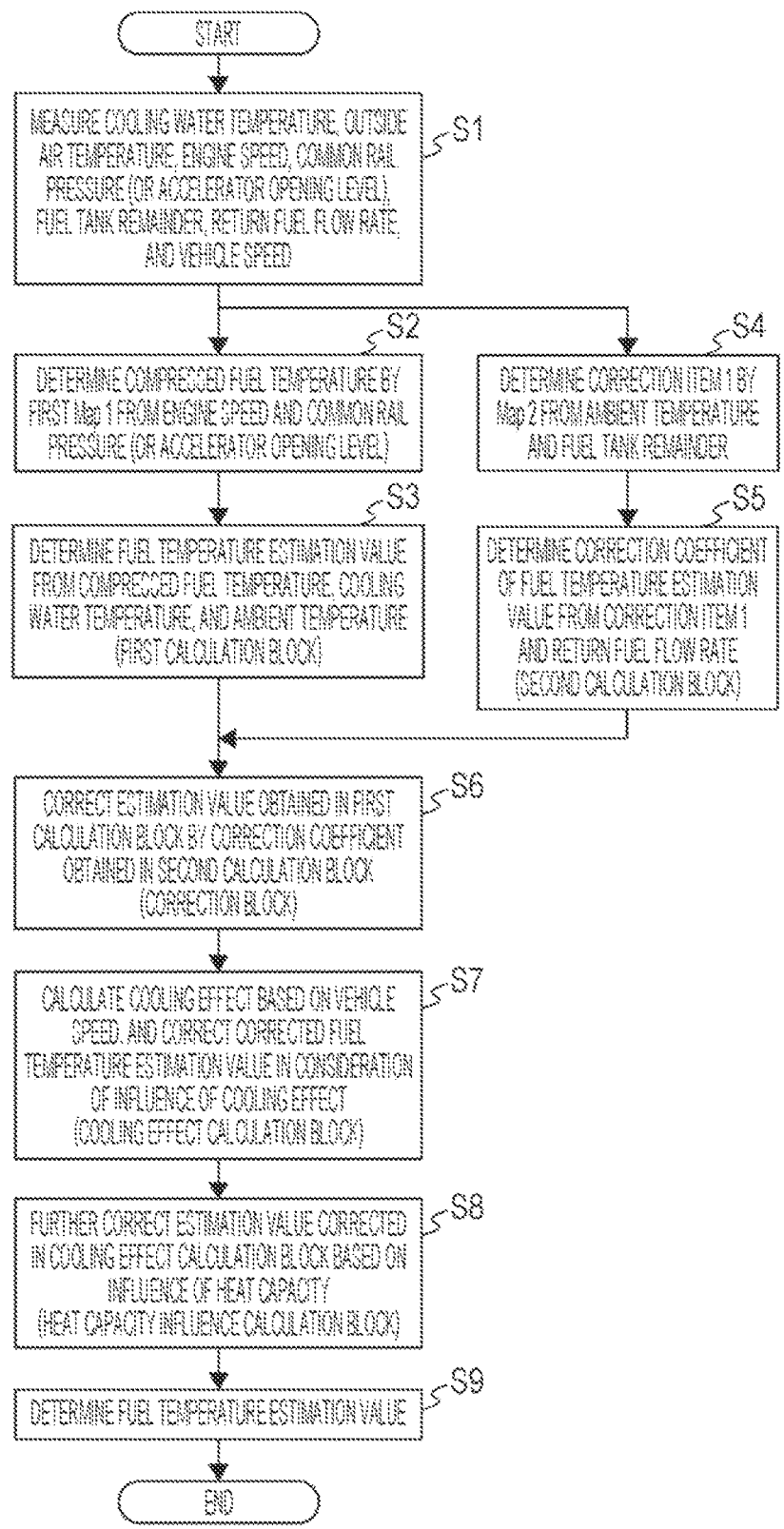
FIG. 3 is a flowchart illustrating control according to the first embodiment.

In Step S1 of FIG. 3, the following process is performed.

A cooling water temperature is measured by the cooling liquid temperature sensor SR1, and the measured temperature data of the cooling water is input to the first calculation block 521.

An outside air temperature is measured by the outside air temperature sensor SR2, and the measured outside air temperature data is input to the first calculation block 521 and the second map 512.

An engine speed is measured by the engine speed sensor SR3, and the measured engine speed is input to the first map 511.

Furthermore, a common rail pressure is measured by the common rail pressure sensor SR4, and the measured fuel pressure (common rail pressure) is input to the first map 511. Herein, instead of the common rail pressure, an accelerator opening level may be measured.

A remainder of the fuel in the fuel tank is measured by the in-tank fuel remainder sensor SR5, and the measured fuel remainder in the tank is input to the second map 512.

A flow rate of the warm fuel returning to the fuel tank (total flow rate) is measured by the return fuel flow rate meter SR6, and the measured return fuel flow rate is input to the second calculation block 522.

A vehicle speed is measured by the vehicle speed sensor SR7, and the measured vehicle speed is input to the cooling effect calculation block 54.

In Step S1 of FIG. 3, the above-mentioned process is performed.

In Step S2, in the first map 511, the controller 50 determines a temperature of a compressed fuel from the engine speed and the common rail pressure input in Step S1. Then, the procedure proceeds to Step S3.

Herein, the "first map 511" means a unit having a function of determining a temperature of the compressed fuel from the engine speed and the common rail pressure. Furthermore, the "determination value of the temperature of the compressed fuel" determined by the first map 511 is not the "final fuel temperature estimation value" of the fuel to be injected into the cylinder which is finally obtained. The "final fuel temperature estimation value" finally obtained by the controller 50 is obtained by performing correction (described below) on the "determination value of the temperature of the compressed fuel" determined by the first map 511.

In Step S3, in the first calculation block 521, the controller 50 calculates the fuel temperature estimation value based on the determination value of the temperature of the compressed fuel obtained by the first map 511 in Step S2 and the cooling water temperature and a circumstance temperature (for example, the outside air temperature) measured in Step S1. The first calculation block 521 has a function of calculating the fuel temperature estimation value based on the determination value of the temperature of the compressed fuel obtained by the first map 511, the cooling water temperature and the circumstance temperature (for example, the outside air temperature) measured in Step S1.

When the fuel temperature estimation value is calculated by the first calculation block 521, the procedure proceeds to Step S6.

Here, the processes of Steps S4 and S5 are performed in parallel with Steps S2 and S3.

In Step S4, "Correction item 1" is determined by the second map 512 based on the outside air temperature and the fuel remainder. Then, the procedure proceeds to Step S5.

Herein, "Correction item 1" is a correction temperature for correcting a difference (a change depending on a temperature environment of the surrounding) of the temperature of the fuel injected into the cylinder, and is used to correct a temperature at the time when the fuel stored in the fuel tank 4 reaches the injectors 3 through the fuel feed system. The "second map 512" is a unit having a function of determining the "Correction item 1" based on the outside air temperature and the fuel remainder.

In Step S5, the second calculation block 522 determines a correction coefficient of the fuel temperature estimation value based on "Correction item 1" determined in Step S4 and the flow rate of the warm fuel returning to the tank. In other words, the second calculation block 522 has a function of determining the correction coefficient of the fuel temperature estimation value based on "Correction item 1" determined by the second map 512 and the flow rate of the warm fuel returning to the tank.

When the correction coefficient of the fuel temperature estimation value is determined, the procedure proceeds to Step S6.

In Step S6, the correction block 53 of the controller 50 corrects the fuel temperature estimation value obtained by the first calculation block 521 based on the correction coefficient obtained by the second calculation block 522. In other words, the correction block 53 has a function of correcting the fuel temperature estimation value obtained by the first calculation block 521 using the correction coefficient obtained by the second calculation block 522.

When the fuel temperature estimation value obtained by the first calculation block 521 is corrected by the second calculation block 522, the procedure proceeds to Step S7.

In Step S7, a cooling effect is computed (calculated) by the cooling effect calculation block 54 of the controller 50 based on the vehicle speed measured in Step S1, and the fuel temperature estimation value corrected in Step S6 is further corrected in consideration of the influence of the cooling effect.

When the fuel temperature estimation value corrected in Step S6 is further corrected by the cooling effect calculation block 54, the procedure proceeds to Step S8.

In Step S8, the heat capacity influence calculation block 55 of the controller 50 further corrects the estimation value corrected by the cooling effect calculation block 54 in Step S7 in consideration of the influence of a heat capacity. Herein, as a parameter to be considered as the influence caused by the heat capacity, for example, there are the heat capacity of a casing of the fuel tank 4 and the like.

The value corrected in Step S8 is determined as a final fuel temperature estimation value (Step S9), and the control is ended.

According to the first exemplary embodiment, the fuel flow rate of the line Lf17 in the fuel return system of a fuel channel is measured by the return fuel flow rate meter SR6, and an estimated fuel temperature in the injectors 3 is corrected by the correction block 53 of the controller 50 based on the measured fuel flow rate. Therefore, an accurate fuel temperature immediately before the injection of the injectors 3 is estimated.

Since the fuel temperature in the fuel channel is affected by the flow rate of the warm fuel returning from the engine to the fuel tank 4, it is possible to improve the accuracy of the fuel temperature estimation value immediately before the injection by setting the flow rate of the warm fuel returning from the engine to the fuel tank 4 as a parameter (correction parameter) in the control of the fuel temperature estimation.

Next, a second embodiment of the invention will be described based on FIGS. 4 and 5 with reference to FIG. 1.

Figure 4:
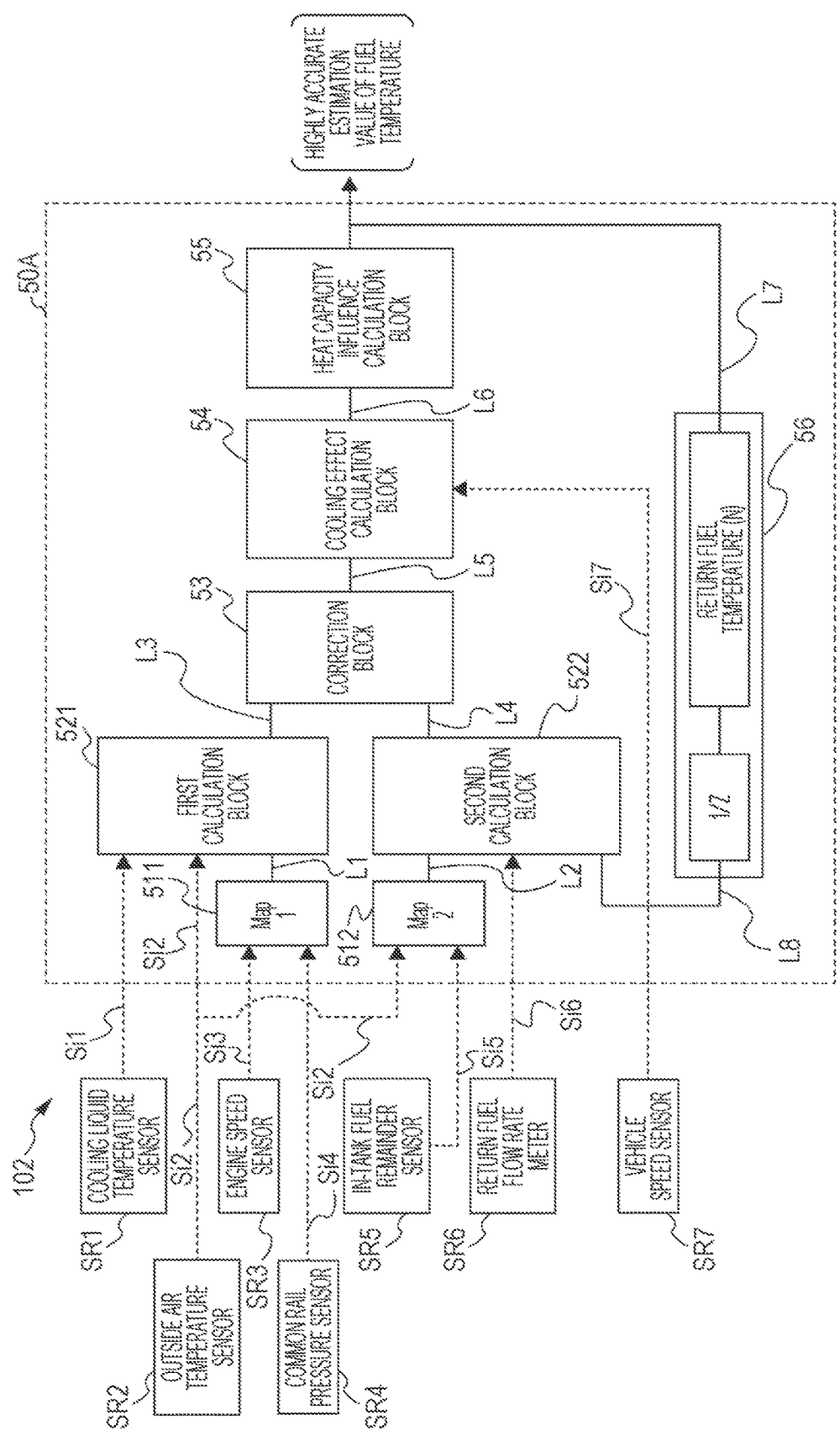
FIG. 4 is a block diagram illustrating a second embodiment of the invention.
Figure 5:
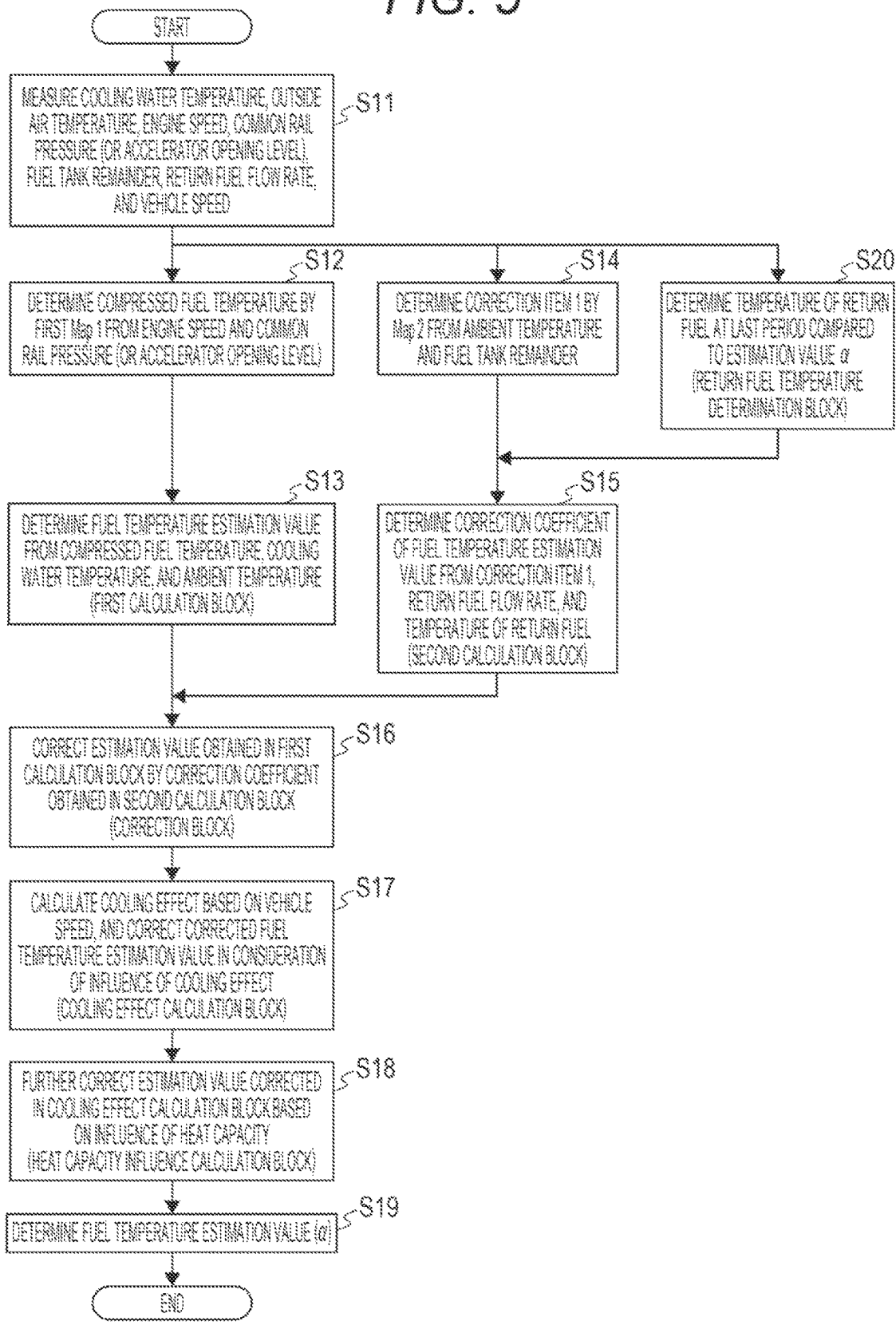
FIG. 5 is a flowchart illustrating control according to the second embodiment.

In the second embodiment of FIGS. 4 and 5, a return fuel temperature determination block is additionally installed in a controller 50A unlike the first embodiment of FIGS. 2 and 3.

Hereinafter, the configurations of the second embodiment different from those of the first embodiment will be described.

In FIG. 4, a fuel temperature estimation device 102 of the second embodiment is different from the fuel temperature estimation device 101 of the first embodiment in that the controller 50A includes a return fuel temperature determination block 56, which is not included in the controller 50.

The return fuel temperature determination block 56 is a block that determines a temperature of the fuel returning to the fuel tank 4 (see FIG. 1), and the temperature of the fuel returning to the fuel tank 4 is set on the condition that the fuel having the same temperature as that of the fuel immediately before the injection of the injectors 3 returns to the fuel tank 4. Therefore, as described below, the temperature of the fuel returning to the fuel tank 4 (see FIG. 1) determined by the return fuel temperature determination block 56 is set as the fuel temperature estimation value (the final fuel temperature estimation value corrected by the heat capacity influence calculation block 55) immediately before the injection in the last period of the control cycle.

The return fuel temperature determination block 56 is connected to the output side of the heat capacity influence calculation block 55 (in which an estimation value of the accurate fuel temperature immediately before the injection of the injectors 3 is output) through a line L7, and connected to the second calculation block 522 through a line L8. Then, the return fuel temperature determination block 56 has a function of storing the estimation value of the fuel temperature in the last period of the control cycle, and transmitting the estimation value as a calculation parameter to the second calculation block 522 in the next period of the control cycle. In the return fuel temperature determination block 56, the member denoted by "1/Z" is a unit having a function of transmitting the estimation value to the second calculation block 522 in the next period of the control cycle.

The estimation value of the fuel temperature in the last period of the control cycle is a fuel temperature estimation value output as the estimation value of the accurate fuel temperature immediately before the injection of the injectors 3 in the last period of the control cycle, and is output from the heat capacity influence calculation block 55.

Next, the control of estimating the fuel temperature according to the second embodiment will be described based on FIG. 5 with reference to FIGS. 1 and 4.

Furthermore, in the description of the control according to the second embodiment based on a flowchart of FIG. 5, the processes of the flowchart of FIG. 3 described in the first embodiment will be simply described and the redundant description will not be repeated.

Steps S11 to S14 and S16 to S19 in FIG. 5 correspond to Steps S1 to S4 and S6 to S9 of FIG. 3, and the same processes as those in Steps S1 to S4 and S6 to S9 in the first embodiment are performed.

In the second embodiment, the process of Step S20 is added in parallel with Step S12 (similar to Step S2 of the first embodiment) and Step S14 (similar to Step S4 of the first embodiment).

Step S20 shows the process in the return fuel temperature determination block 56 (see FIG. 4) in which the fuel temperature estimation value (α) determined in Step S19 is stored as many as one period in the return fuel temperature determination block 56 (see FIG. 4) in the last period of the fuel temperature estimation control cycle, and is output as the return fuel temperature to the second calculation block 522.

After the return fuel temperature determination block 56 (see FIG. 4) outputs the return fuel temperature to the second calculation block 522, the procedure proceeds to Step S15.

In Step S15 of FIG. 5, the process similar to that in Step S5 of FIG. 3 is performed, but in Step S15 of FIG. 5, the fuel temperature estimation value determined by the return fuel temperature determination block 56 (see FIG. 4) as the estimation value of the final fuel temperature at the last period (the estimation value of the accurate fuel temperature immediately before the injection of the injectors 3) is stored (secured), and transmitted as the temperature of the return fuel flowing through the fuel return system Lf17(see FIG. 1) to the second calculation block 522.

In the second calculation block 522, the correction coefficient of the fuel temperature estimation value is determined based on "Correction item 1" determined in Step S14, the flow rate of the warm return fuel, and the temperature of the return fuel transmitted from the return fuel temperature determination block 56. The correction coefficient is used to correct the fuel temperature estimation value obtained by the first calculation block 521, in the correction block 53 (see Step S16).

In other words, the second calculation block 522 according to the second embodiment has a function of determining the correction coefficient of the fuel temperature estimation value based on "Correction item 1" determined by the second map 512, the flow rate of the warm return fuel, and the temperature of the return fuel.

In the second embodiment, it is possible to improve the accuracy of the estimation value compared to the first embodiment by using the temperature of the fuel returning to the tank 4 as a control parameter.

The other configurations and the operational advantages of the second embodiment are identical with those of the first embodiment of FIGS. 2 and 3.

Next, a third embodiment will be described based on FIGS. 6 and 7 with reference to FIG. 1.

Figure 6:
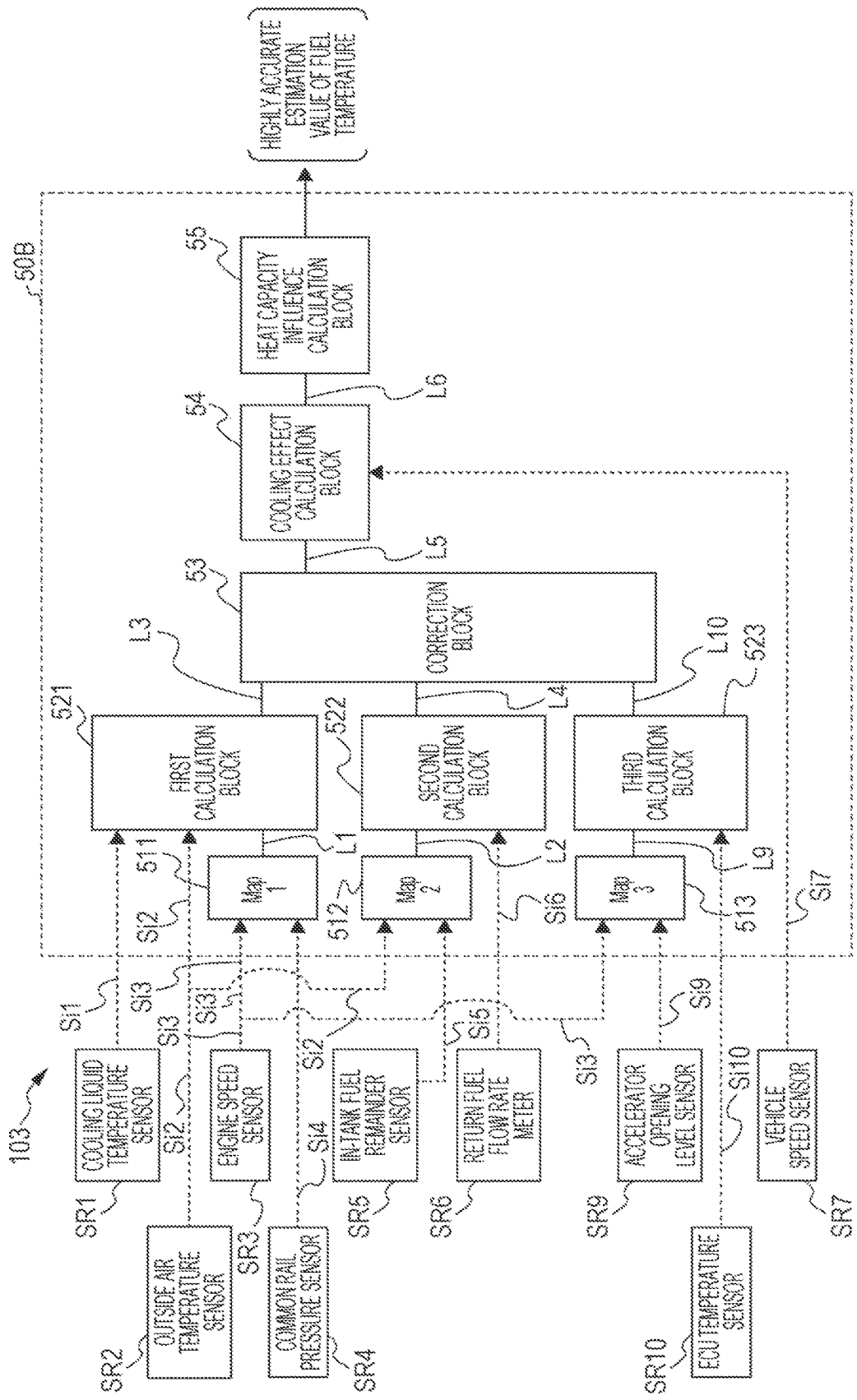
FIG. 6 is a block diagram illustrating a third embodiment of the invention.
Figure 7:
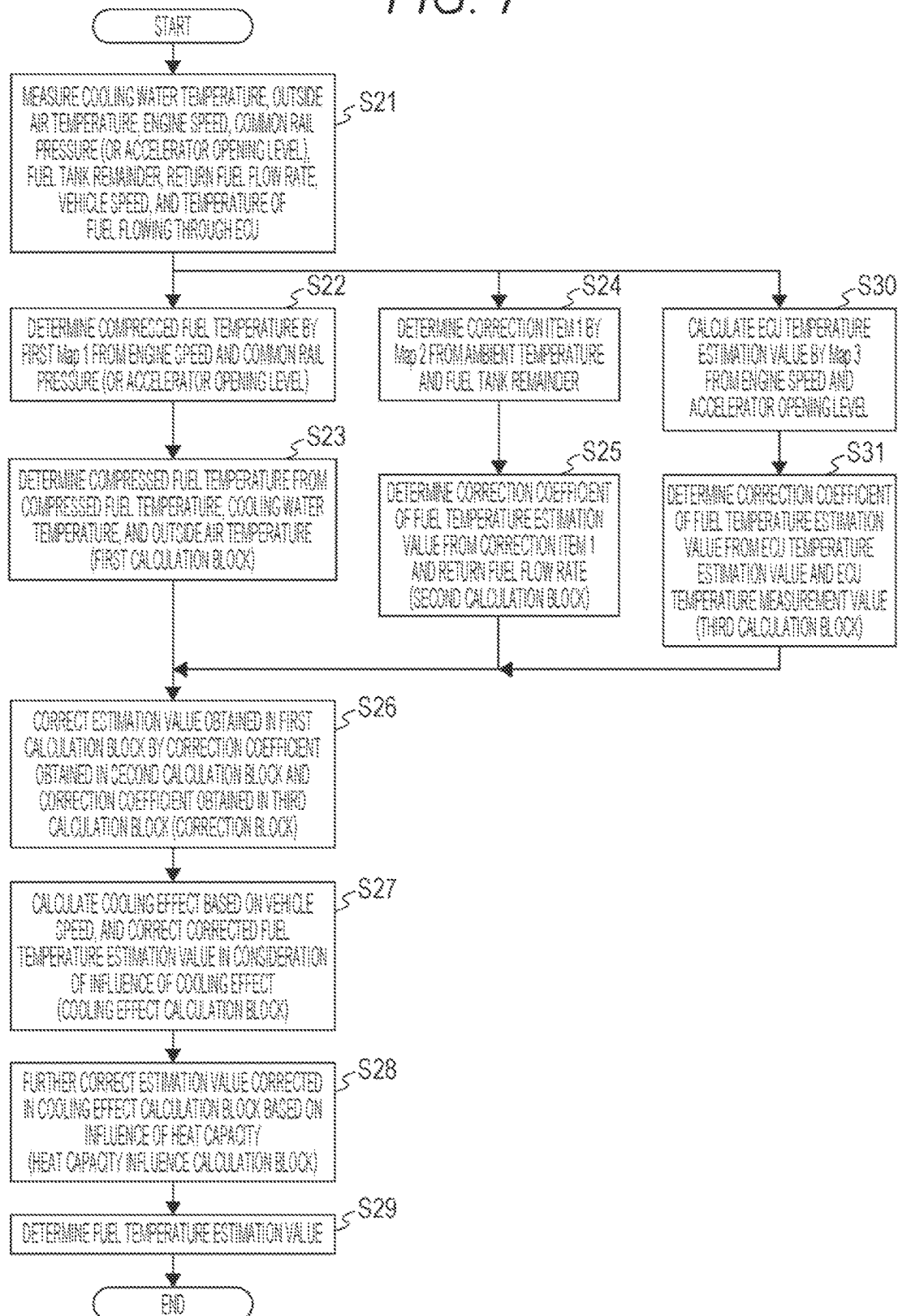
FIG. 7 is a flowchart illustrating control according to the third embodiment.

The entire fuel temperature estimation device according to the third embodiment of FIGS. 6 and 7 is denoted by the symbol 103. Comparing to the first embodiment of FIGS. 2 and 3, the fuel temperature estimation device 103 is provided with a third map 513 and a third calculation block 523 in a controller 50B. Then, the third embodiment is different from the first embodiment in that the accelerator opening level measured by an accelerator opening level sensor SR9 and the temperature (also including the case of the temperature in the engine controller 7 and the temperature of the surface of the engine controller 7) of the engine controller 7 (see FIG. 1) measured by a temperature sensor SR10 are included as the control parameters.

Hereinafter, the third embodiment of FIGS. 6 and 7 will be described mainly focusing on different points from the first embodiment.

In FIG. 6, the third map 513 of the controller 50B is connected to the accelerator opening level sensor SR9 through an input signal line Si9. Furthermore, the engine speed sensor SR3 is also connected to the third map 513 through the input signal line Si3.

In addition, the third calculation block 523 of the controller 50B is connected to the temperature sensor (ECU temperature sensor) SR10 that measures the temperature of the engine controller 7 (see FIG. 1) through an input signal line Si10.

In the controller 50B, the third map 513 is connected to the third calculation block 523 through a line L9.

Then, the third calculation block 523 is connected to the correction block 53 through a line L10.

Next, the control of the fuel temperature estimation according to the third embodiment will be described based on FIG. 7 with reference to FIGS. 1 and 6.

Regarding the control according to the third embodiment based on a flowchart of FIG. 7, the description on the same processes (steps) as the processes (the respective steps) of the first embodiment will be simplified.

In FIG. 7, Steps S22 to S25 and S27 to S29 correspond to Steps S2 to S5 and S7 to S9 of FIG. 3, and the same processes as those in Steps S2 to S5 and S7 to S9 of FIG. 3 are performed.

Step S21 of FIG. 7 corresponds to Step S1 of FIG. 3, but a process of measuring the temperature of the engine controller 7 (ECU) by the ECU temperature sensor SR10 is added.

Step S26 of FIG. 7 corresponds to Step 6 of FIG. 3, but in Step S26, the fuel temperature estimation value obtained by the first calculation block 521 is corrected by the correction block 53 using the correction coefficient (the correction coefficient of the fuel temperature estimation value determined from the estimation value of the temperature of the engine controller 7 estimated in Step S30 and the measurement value of the temperature of the engine controller 7 measured by the ECU temperature sensor SR10, described in Step S31 below) obtained by the third calculation block 523 in addition to the correction coefficient obtained by the second calculation block 522.

In FIG. 7, the processes of Steps S30 and S31 are further added in parallel with Steps S22 and S23 (similarly to Steps S2 and S3 of FIG. 3) and Steps S24 and S25 (similarly to Steps S4 and S5 of FIG. 3).

In Step S30 of FIG. 7, the third map 513 calculates the estimation value of the temperature of the engine controller 7 from the engine speed and the accelerator opening level measured by Step S21. Herein, the third map 513 is a unit having a function of calculating the estimation value of the temperature of the engine controller 7 from the measurement value of the engine speed and the measurement value of the accelerator opening level.

In Step S31 of FIG. 7, as described above regarding Step S26, the third calculation block 523 determines the correction coefficient of the fuel temperature estimation value from the estimation value of the temperature of the engine controller 7 estimated in Step S30 and the measurement value of the temperature of the engine controller 7 measured by the ECU temperature sensor SR10.

As illustrated in FIG. 1, the fuel feed line Lf1 is disposed in the vicinity of the engine controller 7, and the temperature of the fuel flowing in the fuel feed line Lf1 is affected by the temperature of the engine controller 7.

According to the third embodiment illustrated in FIGS. 6 and 7, since the estimation value and the measurement value of the temperature of the engine controller 7 are added to the control parameter, it is possible to obtain a fuel temperature estimation value immediately before the injection with a high accuracy compared to the first embodiment of FIGS. 2 and 3.

The other configurations and the operational advantages of the third embodiment are identical with those of the first embodiment of FIGS. 2 and 3.

Figure 8:
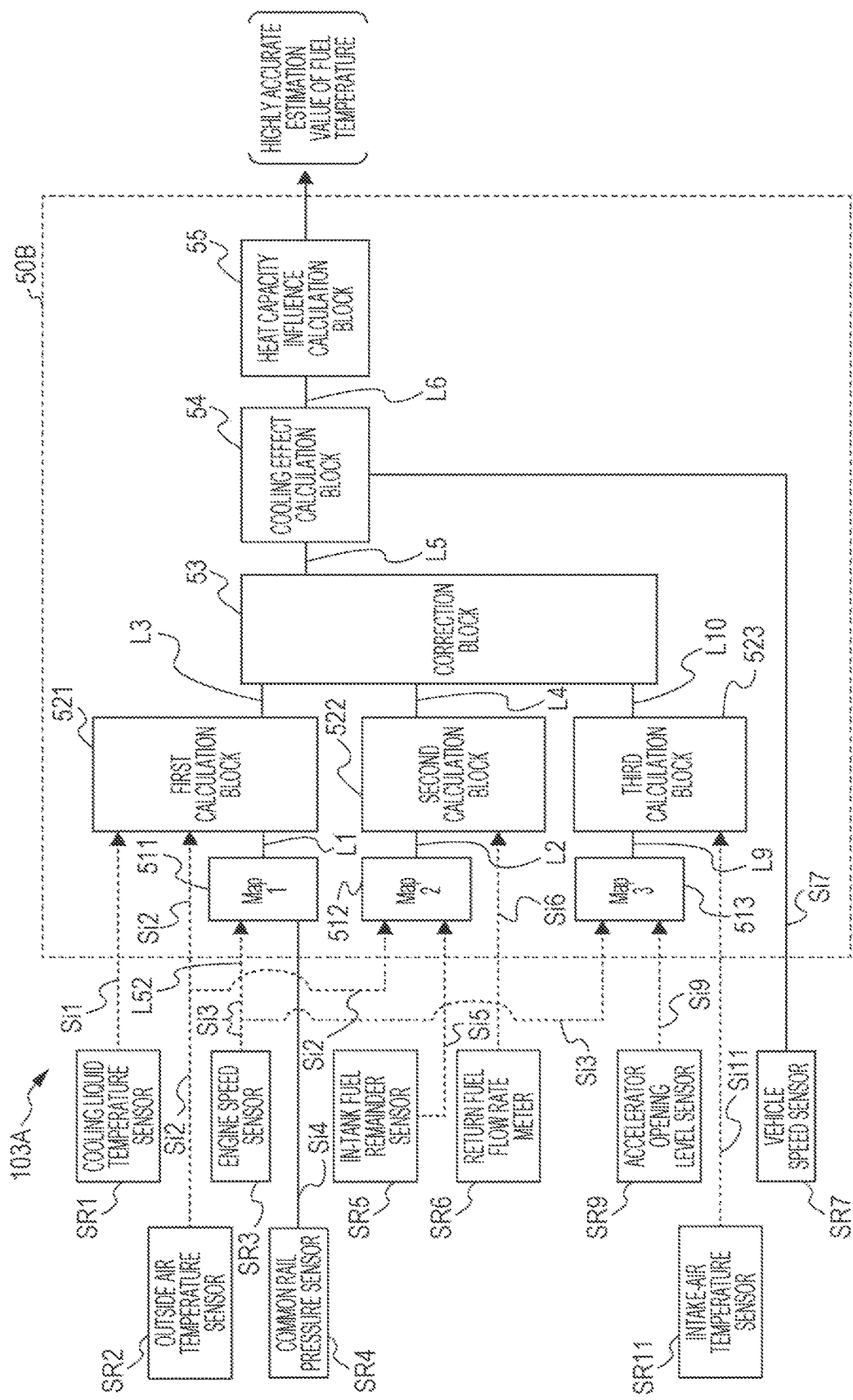
FIG. 8 is a block diagram illustrating a modification of the third embodiment.

FIG. 8 illustrates a modification according to the third embodiment.

The entire fuel temperature estimation device according to the modification of the third embodiment of FIG. 8 is denoted by the symbol 103A.

In the fuel temperature estimation device 103A, the temperature sensor SR10 of the engine controller 7 in the fuel temperature estimation device 103 of the third embodiment illustrated in FIG. 6 is replaced with an intake-air temperature sensor SR11. The intake-air temperature sensor SR11 is configured to have a function of measuring an intake-air temperature in an intake manifold, and connected to the third calculation block 523 through an input signal line S11. Furthermore, the temperature sensor (not illustrated) that measures a temperature in an engine compartment may be provided instead of the intake-air temperature sensor SR11 that measures the intake-air temperature in the intake manifold.

The other configurations and the operational advantages of the modification of the third embodiment of FIG. 8 are identical with those of the third embodiment of FIGS. 6 and 7. In other words, when the description about the ECU temperature (the temperature of the engine controller 7) according to the third embodiment of FIGS. 6 and 7 is replaced with the intake-air temperature in the intake manifold, it will be the description of the modification of FIG. 8.

Next, a fourth embodiment will be described based on FIGS. 9 and 10 with reference to FIG. 1.

Figure 9:
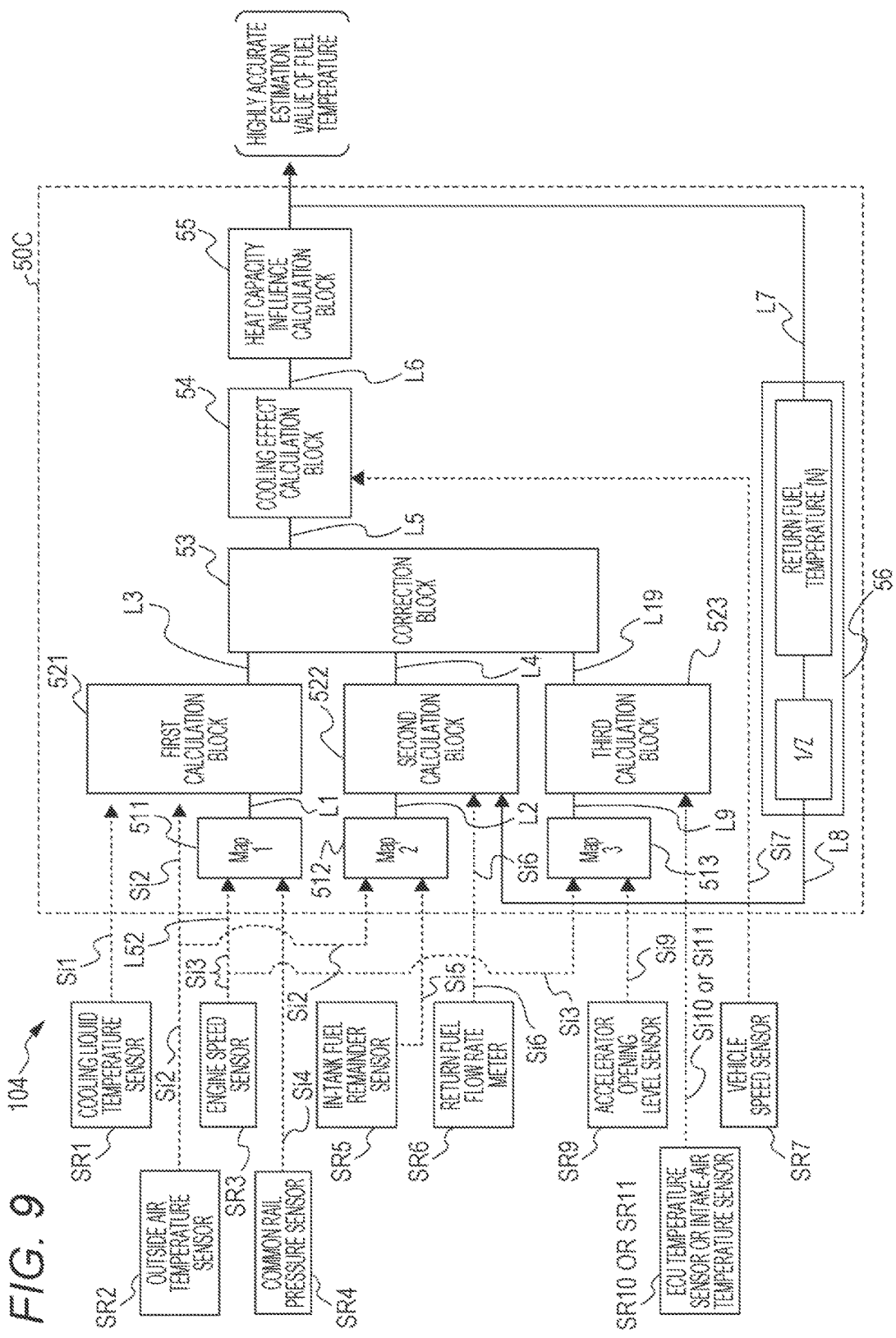
FIG. 9 is a block diagram illustrating a fourth embodiment of the invention.
Figure 10:
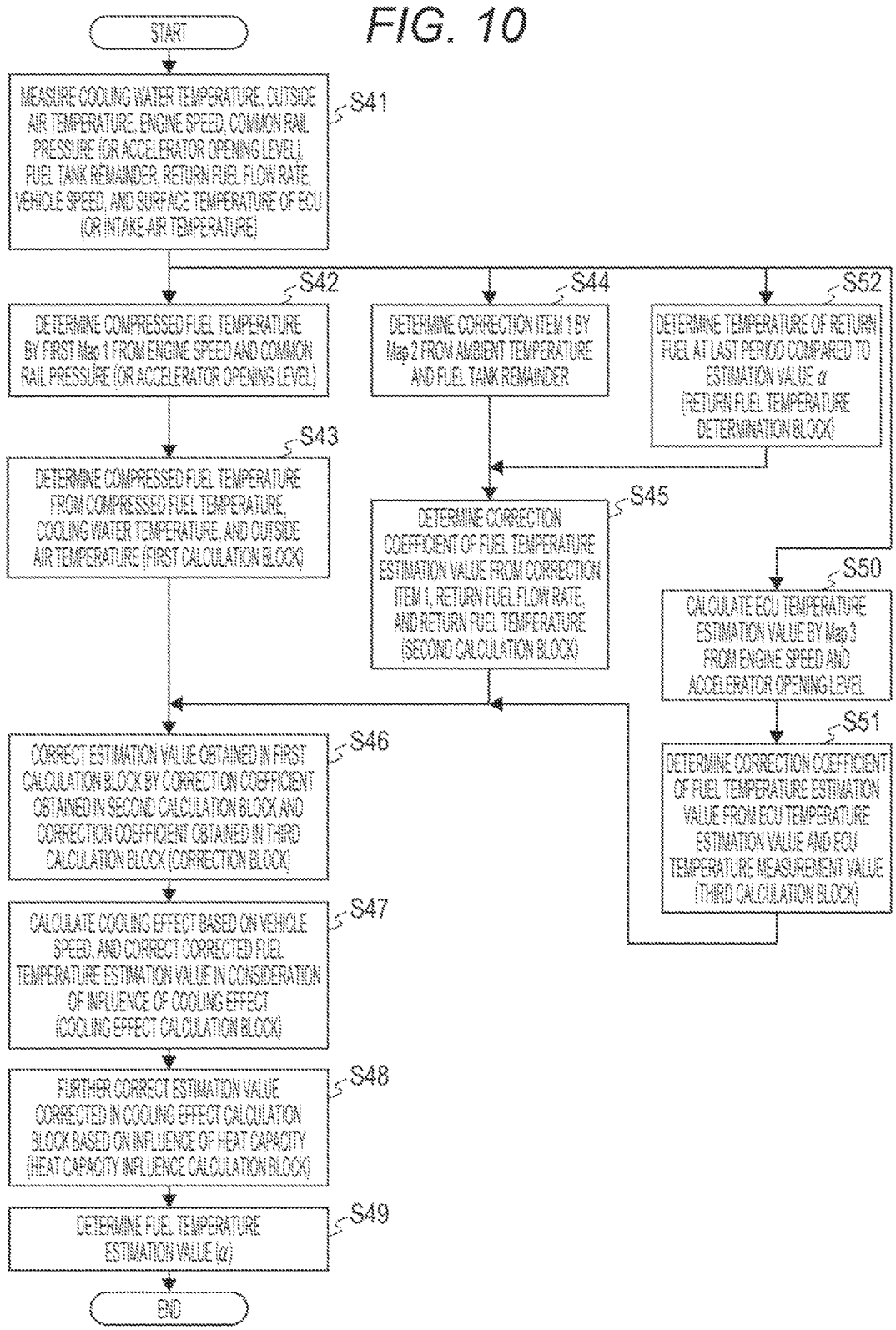
FIG. 10 is a flowchart illustrating control according to the fourth embodiment.

The entire fuel temperature estimation device according to the fourth embodiment of FIGS. 9 and 10 is denoted by the symbol 104.

The fuel temperature estimation device 104 is configured such that the return fuel temperature determination block (the second embodiment of FIGS. 4 and 5) is additionally installed in a controller 50C compared to the third embodiment of FIGS. 6 and 7.

Hereinafter, the fuel temperature estimation device 104 according to the fourth embodiment of FIGS. 9 and 10 will be described mainly focusing on different points from the third embodiment of FIGS. 6 and 7.

The fuel temperature estimation device 104 of the fourth embodiment illustrated in FIG. 9 is different from the fuel temperature estimation device 103 according to the third embodiment (see FIG. 6) in that the return fuel temperature determination block 56 is provided in the controller 50C.

The return fuel temperature determination block 56 has the same configurations and functions as those described in the second embodiment of FIGS. 4 and 5, and is connected to the output side of the heat capacity influence calculation block 55 through the line L7, and is connected to the second calculation block 522 through the line L8.

The return fuel temperature determination block 56 has a function of storing the final estimation value of the fuel temperature (the output of the heat capacity influence calculation block 55) at the last period of the control cycle, and transmitting the final estimation value to the second calculation block 522 as the parameter for estimating the fuel temperature as the temperature of the fuel returning to the fuel tank 4 (see FIG. 1) in the next period of the control cycle.

Similarly to the description in FIG. 4, the member denoted by "1/Z" in the return fuel temperature determination block 56 is a unit having a function of transmitting the estimation value to the second calculation block 522 in the next period of the control cycle.

In addition, as described regarding the modification of the third embodiment of FIG. 8, it is possible to use the intake-air temperature sensor SR11 that measures the intake-air temperature in the intake manifold instead of the temperature sensor (ECU temperature sensor) SR10 of the engine controller 7. Then, the temperature sensor (not illustrated) that measures a temperature in an engine compartment may be provided instead of the intake-air temperature sensor SR11 that measures the intake-air temperature in the intake manifold.

The control of the fuel temperature estimation according to the fourth embodiment will be described based on FIG. 10 with reference to FIGS. 1 and 9.

Regarding the control of the fuel temperature estimation according to the fourth embodiment based on a flowchart of FIG. 10, the description on the same processes (steps) as the processes (the respective steps) of the third embodiment of FIGS. 6 and 7 will be simplified.

In FIG. 10, Steps S41 to S44, S46 to S49, and S50 to S51 correspond to Steps S21 to S24, S26 to S29, and S30 to S31 of FIG. 7 showing the control of the third embodiment, and the same processes as those in Steps S21 to S24, S26 to S29, and S30 to S31 of FIG. 7 are performed.

In Step S45 corresponding to Step S25 of the third embodiment, the correction coefficient of the fuel temperature estimation value is determined from "Correction item 1" determined in Step S44, the flow rate of the warm return fuel, and the temperature of the return fuel transmitted from the return fuel temperature determination block 56 (the final fuel temperature estimation value in the last period). The correction coefficient is used in the correction block 53 to correct the fuel temperature estimation value obtained by the first calculation block 521 (see Step S46).

In other words, the estimation value of the fuel temperature finally determined at the last period is stored in the return fuel temperature determination block 56 (see FIG. 9), the temperature (the estimation value of the finally-determined fuel temperature) is set as the return fuel temperature and output to the second calculation block 522 in the next period of the control cycle, and the correction coefficient of the fuel temperature estimation value is determined. Here, the process of Step S45 is performed by the second calculation block 522, and identical with Step S15 of FIG. 5.

The process of Step S52 is added in parallel with Step S42 (identical with Step S22 of FIG. 7), Step S44 (identical with Step S24 of FIG. 7), and Step S50 (identical with Step S30 of FIG. 7) of FIG. 10.

In Step S52, the return fuel temperature determination block 56 (see FIG. 9) determines the fuel temperature estimation value (α, the finally-determined fuel temperature estimation value) determined in Step S49 at the last period as the temperature of the return fuel. Then, the procedure proceeds to Step S45.

The other configurations and the operational advantages of the fourth embodiment are identical with those of the third embodiment of FIGS. 6 and 7.

The embodiments are given as merely exemplary, and do not limit the technical scope of the invention.

For example, although in the exemplary embodiments, the estimation value of the fuel temperature in the common rail is obtained, the temperature in other channels may be obtained.

In addition, although in the exemplary embodiments, the fuel temperature in the vicinity of the engine controller 7 (the third embodiment) and the temperature in the engine compartment or the intake-air temperature in the intake manifold (the modification of the third embodiment) are used as the "temperature at a place related to the fuel temperature", other parameters may be used.

Furthermore, in the control flowchart in each embodiment (FIGS. 3, 5, 7, and 10), the process of measuring various types of parameters (the first steps in FIGS. 3, 5, 7, and 10) is not limited to its sequence in the drawing, and the measuring may be performed immediately before the process in which the subject parameter is used.

In addition, a fuel amount obtained by subtracting a fuel injection amount of the injector from the drawn fuel amount based on a control value of the drawn flow rate of the fuel pump may be used instead of the return fuel flow rate meter (SR6 etc.).

It should be noted that the entire contents of Japanese Patent Application No. 2012-269070, filed on Dec. 10, 2012, on which convention priority is claimed, is incorporated herein by reference.

It should also be understood that many modifications and variations of the described embodiments of the invention will be apparent to a person having an ordinary skill in the art without departing from the spirit and scope of the present inventions as claimed in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A fuel temperature estimation device, comprising:
a flow rate meter configured to measure a return fuel flow rate of a fuel return system of a fuel channel;
a temperature sensor configured to measure a temperature of an engine controller disposed in a vicinity of the fuel channel; and
a controller,
wherein the controller is configured to estimate an injection fuel temperature of a fuel injection system of the fuel channel, and wherein the controller includes a fuel temperature correction unit that is configured to correct the estimated injection fuel temperature of the fuel injection system based on the return fuel flow rate and the temperature of the engine controller.

2. A fuel temperature estimation device, comprising:
a flow rate meter configured to measure a return fuel flow rate of a fuel return system of a fuel channel;
a temperature sensor configured to measure a temperature of an engine controller disposed in a vicinity of the fuel channel or a temperature at a place related to a fuel temperature of the fuel channel; and
a controller,
wherein the controller is configured to estimate an injection fuel temperature of a fuel injection system of the fuel channel, and
wherein the controller includes a return fuel temperature determination unit that is configured to determine a return fuel temperature and a fuel temperature correction unit that is configured to correct the estimated injection fuel temperature of the fuel injection system based on the return fuel flow rate, the return fuel temperature and the temperature of the engine controller disposed in the vicinity of the fuel channel or the temperature at the place related to the fuel temperature of the fuel channel.

3. The fuel temperature estimation device according to claim 1, further comprising:
an engine speed sensor;
a common rail pressure sensor;
a cooling liquid temperature sensor; and
an outside air temperature sensor,
wherein the controller is configured to estimate the injection fuel temperature based on an engine speed measured by the engine speed sensor, a common rail pressure measured by the common rail pressure sensor, a cooling liquid temperature measured by the cooling liquid temperature sensor and an outside air temperature measured by the outside air temperature sensor.

4. The fuel temperature estimation device according to claim 2, further comprising:
an engine speed sensor;
a common rail pressure sensor;
a cooling liquid temperature sensor; and
an outside air temperature sensor,
wherein the controller is configured to estimate the injection fuel temperature based on an engine speed measured by the engine speed sensor, a common rail pressure measured by the common rail pressure sensor, a cooling liquid temperature measured by the cooling liquid temperature sensor and an outside air temperature measured by the outside air temperature sensor.

* * * * *